(No Model.)
J. P. LAVIGNE.
SPLIT PULLEY.
No. 593,398. Patented Nov. 9, 1897.
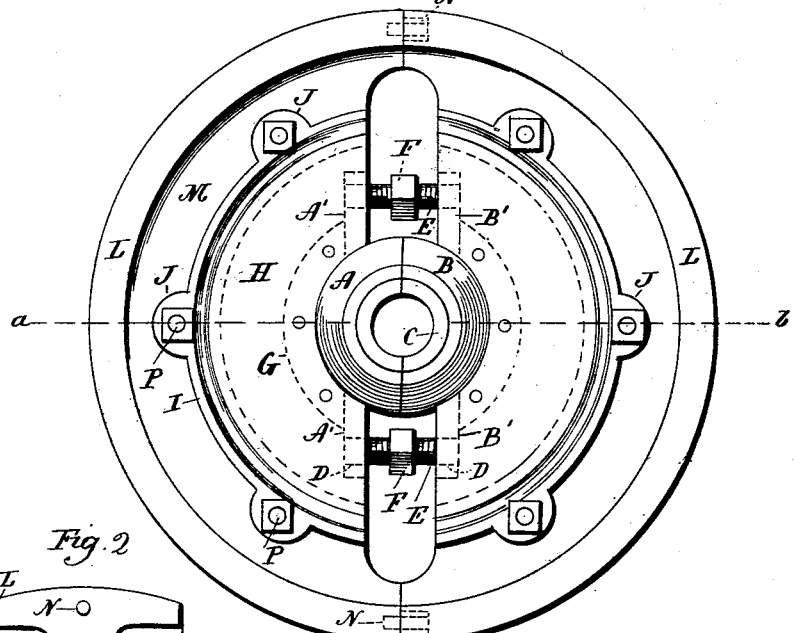
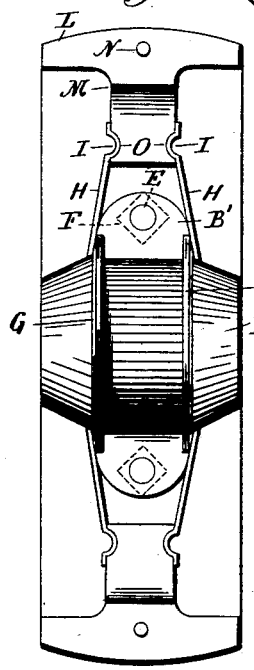
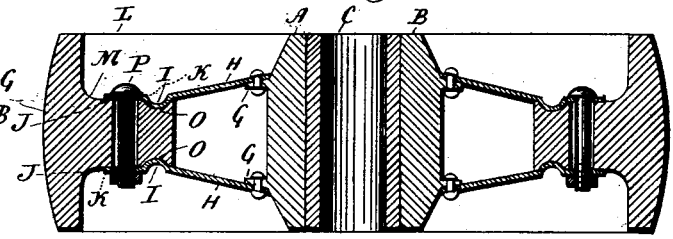
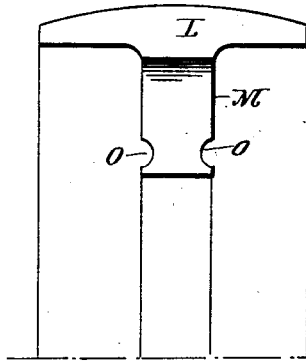
Witnesses
J. H. Shumway
Lillian D. Kelsey
Joseph P. Lavigne
Inventor
By atty.
Earle Seymour
THE NORRIS PETERS CO., PHOTO-LITHO., WASHINGTON, D. C.

UNITED STATES PATENT OFFICE.

JOSEPH P. LAVIGNE, OF NEW HAVEN, CONNECTICUT, ASSIGNOR OF ONE-HALF TO WILBUR P. DAY, OF SAME PLACE.

SPLIT PULLEY.

SPECIFICATION forming part of Letters Patent No. 593,398, dated November 9, 1897.

Application filed December 17, 1896. Serial No. 616,063. (No model.)

*To all whom it may concern:*

Be it known that I, JOSEPH P. LAVIGNE, of New Haven, in the county of New Haven and State of Connecticut, have invented a new Improvement in Split Pulleys; and I do hereby declare the following, when taken in connection with the accompanying drawings and the letters of reference marked thereon, to be a full, clear, and exact description of the same, and which said drawings constitute part of this specification, and represent, in—

Figure 1, a side view of a pulley constructed in accordance with my invention; Fig. 2, an edge view with the plates and rim removed from one section; Fig. 3, a section on line *a b* of Fig. 1; Fig. 4, a view of a section of a rim detached and of greater diameter and with a wider face than the rim shown in Figs. 1, 2, and 3.

This invention relates to an improvement in split pulleys, and particularly to that class in which the rim is formed from wood, paper, or other fibrous material, the object of the invention being to provide a hub from which the rims may be readily detached and other rims of larger or smaller diameter and width substituted therefor; and the invention consists in the construction as will be hereinafter described, and particularly recited in the claims.

The hub proper is formed in two parts A B, within which is preferably arranged a wooden bushing C. On opposite sides, and near the ends of the sections A B, project lugs A' B', which are formed integral with said hub and are provided with threaded openings D to receive clamping-screws E, the ends of which are oppositely threaded and the center of which is provided with a grip F, and so that by turning the screws the parts of the hub may be brought together. On the opposite side of each section of the hub is a flange G, to which are secured semicircular plates H, in the outer edge of each of which is an inwardly-extending concentric rib I. At various points in the periphery of these plates are arms J, formed with screw-openings K. The rim proper is formed in two parts, and consists of a face L and an inwardly-extending centrally-arranged web M, which is slightly cut away at the ends of each section, as clearly shown in Fig. 1, and so that the extreme ends of the rim may be brought together. Preferably dowel-pins N will be located between the abutting ends of the rim. On the opposite faces of the web M are recesses O corresponding to the ribs I in the plates H. The rim is held by having the web placed between the plates H and so that the ribs I extend into the recesses O, where they are held by bolts P, which extend through the arms J of each plate and through said web, in which the screw-holes are larger in diameter than the diameter of the bolts, and so that the rim is firmly secured between said plates. By forcing the ribs on the plates into the grooves in the web of the rim the ends of the rim are crowded together. If a rim of larger diameter or wider face is required, it is only necessary to remove the screws P, when the sections of one rim may be removed and replaced by sections of a rim of larger or smaller diameter and of wider or narrower face. When the rim-sections are thus secured to the plates, if their edges do not properly abut they may be brought into proper relation by the adjusting-screws E. Thus the size of the pulley may be changed upon a shaft without removing the other parts therefrom, although with this construction it is a simple matter to remove the screws E, when the parts of the entire pulley may be separated and removed at pleasure.

It will be understood that I am aware that wooden arms for pulleys are not new and that sectional rims have also been employed, and I do not wish to be understood as claiming either broadly as my invention; but, Having fully described my invention, what I claim as new, and desire to secure by Letters Patent, is—

1. In a split pulley, the combination with a two-part hub formed with integral flanges, with plates secured thereto, of a sectional rim formed with an inwardly-extending web by means of which the rim is secured to the plates, the web of the rim and the plates being constructed the one with a groove and the other with ribs to take into each other for the location of the web between the plates.

2. In a split pulley, the combination with a two-part hub, formed with flanges, of plates secured thereto, and formed with inwardly-extending ribs concentric with the hub, and a sectional rim constructed with an inwardly-extending web by means of which the rim is attached to the plates, and which is formed with grooves to receive the ribs of the plates.

3. In a split pulley, the combination with a two-part hub, each part of which is constructed with two flanges and with two lugs, of adjusting-screws applied to the said lugs for holding the two parts of the hub together on the shaft, plates secured to the outer faces of the said flanges of the parts of the hub and formed with inwardly-extending concentric ribs, and a sectional rim having a centrally-arranged, inwardly-extending web adapted to be inserted between the outer edges of the plates, and formed with concentric grooves to receive the ribs on the plates, substantially as described.

In testimony whereof I have signed this specification in the presence of two subscribing witnesses.

JOSEPH P. LAVIGNE.

Witnesses:
LILLIAN D. KELSEY,
FRED. C. EARLE.